United States Patent
Lenz et al.

[11] 4,096,200
[45] Jun. 20, 1978

[54] N-ALKYL POLYURETHANE/VINYL POLYMER MIXTURES

[75] Inventors: Günther Lenz, Krefeld; Josef Merten, Korschenbroich; Heinrich Krimm, Krefeld; Horst-Günter Kassahn, Krefeld; Hermann Schnell, Krefeld, all of Germany

[73] Assignee: Bayer Aktiengesellschaft, Germany

[21] Appl. No.: 717,553

[22] Filed: Aug. 25, 1976

Related U.S. Application Data

[63] Continuation of Ser. No. 561,552, Mar. 24, 1975, abandoned.

[30] Foreign Application Priority Data

Mar. 28, 1974 Germany ............................ 2415057

[51] Int. Cl.$^2$ ............................................. C08L 75/04
[52] U.S. Cl. ................................................ 260/859 R
[58] Field of Search ......... 260/47 CB, 47 CZ, 77.5 B, 260/859 R

[56] References Cited
U.S. PATENT DOCUMENTS

| | | | |
|---|---|---|---|
| 3,049,505 | 8/1962 | Grabowski | 260/859 R |
| 3,640,955 | 2/1972 | Krimm | 260/47 CZ |

*Primary Examiner*—Paul R. Michl
*Attorney, Agent, or Firm*—Connolly and Hutz

[57] ABSTRACT

1. High molecular weight, high-impact, readily processible moulding compositions of mixtures of:

(a) aromatic N-alkyl polyurethanes corresponding to the following general formula:

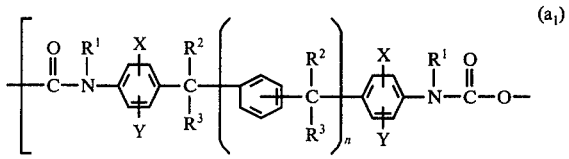

(a$_1$)

-continued

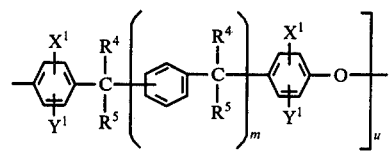

wherein
R$^1$ represents methyl or ethyl;
R$^2$ and R$^3$, which may be the same or different each represents an alkyl radical having such a number of carbon atoms that the total number of carbon atoms in the alkylene bridges is from 3 to 6;
R$^4$ and R$^5$ have the same meanings as R$^2$ and R$^3$;
X and Y, which may be the same or different each represents hydrogen, methyl, chlorine or bromine;
X$^1$ and Y$^1$ have the same meanings as X and Y;
n and m = 0 or 1; and
u is such that the average molecular weight of the polyurethane is from 10,000 to 100,000;

or to the following general formula:

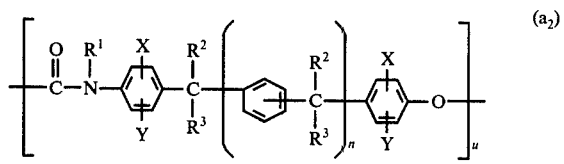

(a$_2$)

wherein
R$^1$, R$^2$, R$^3$, X, Y, n and u are as defined in connection with the above formula:

(b) elastomeric polymers based on butadiene and/or alkyl acrylates, optionally graft-polymerised with radically polymerisable monomers; and, optionally, (c) another homo- or co-polymer of the monomers of (b);

component (a) making up from 80 to 20%, by weight, and the sum of components (b) and (c) from 20 to 80%, by weight, of the moulding composition, and the sum of (b) and (c) being made up of from 25 to 100% by weight, of (b) and of from 75 to 0%, by weight, of (c).

5 Claims, No Drawings

N-ALKYL POLYURETHANE/VINYL POLYMER MIXTURES

CROSS-REFERENCE TO RELATED APPLICATION

This application is a continuation of application Ser. No. 561,552 filed Mar. 24, 1975 and now abandoned.

Aromatic N-alkyl polyurethanes based on disecondary, polynuclear aromatic diamines and polynuclear bisphenols are known and are examples of thermoplastic moulding compositions with good thermal, mechanical and electrical properties, and more especially, with a high resistance to hydrolysis (German Offenlegungsschriften Nos. 1,720,693; 1,720,706; and 1,720,761). By comparison with bisphenol A polycarbonate for example, they have lower impact and notched impact strengths and a relatively high melt viscosity, and hence are difficult to process.

The present invention relates to moulding compositions of mixtures of:

(a) aromatic N-alkyl polyurethanes corresponding to the following general formula:

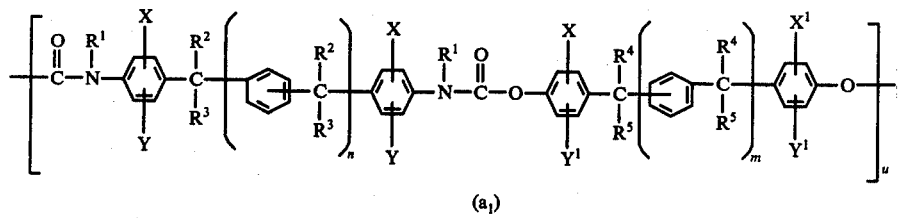

(a₁)

wherein $R^1$ represents methyl or ethyl;

$R^2$ and $R^3$, which may be the same or different, each represents an alkyl radical having such a number of carbon atoms that the total number of carbon atoms in the alkylene bridges is from 3 to 6;

$R^4$ and $R^5$ have the same meanings as $R^2$ and $R^3$;

X and Y which may be the same or different, each represents hydrogen, methyl, chlorine or bromine;

$X^1$ and $Y^1$ have the same meanings as X and Y;

$n$ and $m$ = 0 or 1; and $u$ in such that the average molecular weight of the polyurethane is from 10,000 to 100,000, preferably from 40,000 to 60,000;

or to the following general formula:

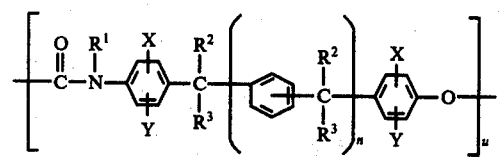

(a₂)

wherein $R^1$, $R^2$, $R^3$, X, Y, $n$ and $u$ are as defined in connection with formula ($a_1$);

(b) elastomeric polymers based on butadiene and/or alkyl acrylates, optionally grafted with radically polymerisable monomers, for example styrene or acrylonitrile or mixtures thereof; and optionally, (c) another homo- or co-polymer of the monomers used for grafting in (b).

The N-alkyl polyurethanes used as component (a) of the moulding compositions according to the invention may be obtained by solution or melt polycondensation processes in accordance with German Offenlegungsschriften Nos. 1,720,693; 1,720,706 and 1,720,761. Thus, a high molecular weight N-methyl polyurethane is obtained, for example in accordance with German Offenlegungsschrift No. 1,720,761, by polycondensing α,α'-(4,4'-di-N-methylaminodiphenyl)-p-diisopropyl benzene with the bis-chlorocarbonic acid ester of bisphenol A in a two-phase reaction medium consisting of a methylene chlorine/chlorobenzene mixture and aqueous sodium hydroxide solution. The structure of this particular polyurethane corresponds to general formula ($a_1$) with $R^1 - R^5$ representing methyl; X and Y representing H; $n = 1$, $m = 0$ and $u$ = about 75. Other processes for producing N-alkyl polyurethanes suitable for use in accordance with the invention are described in German Offenlegungsschriften Nos. 1,720,693 and 1,720,706.

Component (b) of the moulding compositions according to the invention consists of an elastomeric homo- or copolymer based on butadiene and/or alkyl acrylate, onto which one or more radially polymerisable monomer, such as styrene or acrylonitrile or mixtures thereof, may optionally be grafted, and which may be obtained by known methods for example, in accordance with German Auslegeschrift No. 1,247,665 in the case of polymers based on butadiene, and in accordance with German Offenlegungsschrift No. 2,037,419 in the case of polymers based on alkyl acrylates.

Suitable rubbers are, for example, polybutadiene, polybutyl acrylate, butadiene-styrene copolymers containing up to 30%, by weight, of copolymerised styrene, copolymers of butadiene with acrylonitrile containing up to 20%, by weight of acrylonitrile, copolymers of butadiene and lower alkyl esters of acrylic and methacrylic acid, for example especially butyl acrylate or even methyl acrylate, methyl methacrylate and ethyl methacrylate, or copolymers of butyl acrylate containing up to 10%, by weight, of methacrylic acid amide N-methylol methyl ether.

Component (b) may optionally consist of a graft polymer in which a monomer mixture of from 95 to 50% by weight of styrene or methyl methacrylate or mixtures thereof, is graft-polymerised, for example, onto a butadiene rubber and/or a butyl acrylate rubber (cf. German Auslegeschrift No. 1,247,665 and German Offenlegungsschrift No. 2,037,419). The ratio by weight of rubber to graft-polymerised monomers should be from 85 : 15 to 40 : 60.

The elastomeric polymers should preferably be present in the moulding composition in the form of particles with an average diameter of from 0.2 to 5µ, most preferably from 0.2 to 1µ.

In addition to component (b), the elastomeric polymers, the moulding compositions according to the invention may optionally contain another homo- or copolymer, component (c), which is obtained from the graft monomers of (b). The copolymers in question are, for example, copolymers of from 95 to 50%, by weight, of styrene, α-methyl styrene, methyl methacrylate or mixtures thereof, with from 5 to 50% by weight of acrylonitrile, methacrylonitrile, methyl methacrylate or mixtures thereof.

The moulding compositions according to the invention consist of mixtures of from 80 to 20%, by weight, of component (a) and of from 20 to 80%, by weight, of the sum of component (b) and (c). The sum of (b) and (c) may be made up of from 25 to 100%, by weight of (b) and of from 75 to 0%, by weight of (c).

Components (a), (b) and, optionally (c) of the moulding compositions may be separately prepared and then mixed in conventional mixers. Suitable mixers are, for example, mixing rolls, double-screw extruders or internal kneaders. It is also possible to initially prepare the mixture of the elastomeric polymer (b) and copolymer (c) by processing the two components together and subsequently combining the resulting mixture with the N-alkyl polyurethane, component (a). Fillers, glass fibres, pigments or additives such a stabilisers, flameproofing agents, flow promoters, lubricants, antistatic agents, may be added to the moulding compositions during mixing.

The moulding compositions according to the invention may be processed in any conventional hydraulic or screw-type injection-moulding machines and in single- or double-screw extruders at temperatures of from 180° to 300° C, and preferably at temperatures of from 200° to 250° C, to form shaped articles of various kinds, such as profiles, sheeting, tubes, housings, films and utility objects. In addition, the moulding compositions may be blow-moulded into hollow bodies of different kinds or foamed by known methods. Additives of the types mentioned above may also be added to the moulding compositions during processing.

By comparison, for example with pure N-alkyl polyurethanes, the moulding compositions according to the invention show considerably improved impact and notched impact strengths coupled with lower melt viscosities and, hence, improved processability. In addition, they show a number of valuable service properties, such as high dimensional stability to heat, favourable mechanical strengths, resistance to hydrolysis, coupled with outstanding electrical properties, such as dielectric strength and tracking resistance.

EXAMPLES 1 to 5

The N-methyl polyurethane used as component (a) was produced by the phase-interface polycondensation of α,α'-(4,4'-di-N-methyl aminodiphenyl)-p-diisopropyl benzene and bisphenol A bis-chlorocarbonic acid ester in a system of methylene chloride/chlorobenzene and aqueous sodium hydroxide in accordance with DT-OS No. 1,720,761. It has a relative viscosity $\eta_{rel}$ of 1,312 (as measured in methylene chloride, concentration 5 g per liter, at 25° C). The material is in the form of a cylindrical granulate.

Component (b) consists of a graft copolymer of 35% by weight, of styrene and 15% by weight, of acrylonitrile on 50% by weight, of a coarse-particle polybutadiene (average particle diameter 0.3 to 0.4μ) obtained in accordance with DT-AS No. 1,247,665.

Component (c) is a copolymer of 70% by weight of styrene and 30% by weight of acrylonitrile with an intrinsic viscosity of 79.1 (measured in DMF at 20° C).

The components were mixed in a double-screw extruder at from 220° to 250° C in the quantitative ratios quoted for Examples 1 to 5 in Table 1, followed by granulation. The granulate was injection-moulded into standard test bars which were used for determining the properties. Table 1 shows the properties of the moulding compositions produced in accordance with the invention as described in Examples 1 to 5.

Table 1

|  | Units | Examples 1 | 2 | 3 | 4 | 5 |
|---|---|---|---|---|---|---|
| Component (a) | %, by weight | 100 | 60 | 50 | 40 | 30 |
| Component (b) | " |  | 26 | 32.5 | 39 | 45.5 |
| Component (c) | DIN | " |  | 14 | 17.5 | 21 | 24.5 |
| Processing temperature |  | ° C | 280–300 | 250 | 230 | 230 | 220 |
| Tensile strength | 53 455 | kp/cm² | 645 | 527 | 449 | 419 | 379 |
| Flexural strength | 53 452 | kp/cm² | 1288 | 894 | 877 | 794 | 709 |
| Impact strength | 53 453 | cmkp/cm² | 42.4 |  | did not break |  |  |
| Notched impact strength | 53 453 | cmkp/cm² | 4.2 | 13.7 | 24.1 | 31.7 | 27.3 |
| Dimensional stability to heat according to Vicat (method A) | 53 460 | ° C | 162 | 149 | 143 | 142 | 127 |
| Tracking resistance (test solution A) | 53 480 | volt | 180 | 280 | 320 | 280 | 260 |

EXAMPLE 6

As in Examples 1 to 5, component (a) consists of the N-methyl polyurethane obtained in accordance with DT-OS No. 1,720,761, from α,α'-(4,4'-di-N-methyl aminodiphenyl)-p-diisopropyl benzene and bisphenol A bis-chlorocarbonic acid ester. It has a relative viscosity of 1,312 (as measured in methylene chloride, concentration 5 g per liter, at 25° C).

Component (b) consists of a graft copolymer obtained by grafting 47% by weight of styrene and 23% by weight of acrylonitrile onto 30%, by weight, of a copolymer of 96%, by weight, of butyl acrylate and 4%, by weight, of methacrylamide N-methylolmethyl ether.

The mixture of 40%, by weight, of component (a) and 60%, by weight, of component (b) is mixed in a double-screw extruder at from 240° to 260° C, followed by granulation. The granulate was injection-moulded into standard test specimens in the same way as in Examples 1 to 5. The properties determined are shown in Table 2 below:

Table 2

| Property | DIN | Units | Value |
|---|---|---|---|
| Processing temperature |  | ° C | 250 |
| Tensile Strength | 53 455 | kp/cm² | 540 |
| Flexural strength | 53 452 | kp/cm² | 909 |
| Impact strength | 53 453 | cmkp/cm² | did not break |
| Notched impact strength | 53 453 | cmkp/cm² | 14.0 |
| Dimensional stability to heat according to Vicat (method A) | 53 460 | ° C | 122 |
| Tracking resistance (test solution A) | 53 480 | volt | 520 |

We claim:
1. A moulding composition comprising:

(a) at least one aromatic N-alkyl polyurethane corresponding to the following general formula:

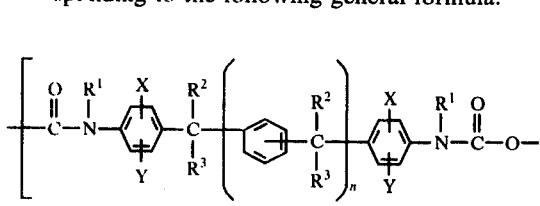
(a₁)

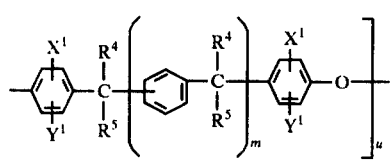

wherein
$R^1$ represents methyl or ethyl;
$R^2$, $R^3$, $R^4$ and $R^5$, which may be the same or different, each represents an alkyl radical having such a number of carbon atoms that the total number of carbon atoms in each of the alkylene bridges formed by $R^2$, $R^3$ and an intervening carbon atom, and by $R^4$, $R^5$ and an intervening carbon atom, is from 3 to 6;
X, Y, $X^1$ and $Y^1$, which may be the same or different, each represents hydrogen, methyl, chlorine or bromine;
$n$ = 0 or 1;
$m$ = 0 or 1; and
$u$ is such that the average molecular weight of the polyurethane is from 10,000 to 100,000;
or corresponding to the following general formula:

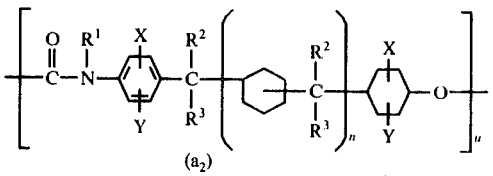
(a₂)

wherein
$R^1$, $R^2$, $R^3$, X, Y, $n$ and $u$ are as defined in connection with general formula ($a_1$) above; and
(b) at least one elastomeric polymer based on butadiene and/or a alkyl acrylate which may be graft-polymerised with at least one radically polymerisible monomer; and, optionally,
(c) a homo- or co-polymer of the monomers of component (b);

component (a) constituting from 80 to 20%, by weight, of the composition, and the sum of components (b) and (c) constitutes from 20 to 80%, by weight, of the composition, the sum of components (b) and (c) being made up of from 25 to 100%, by weight, of component (b) and from 75 to 0% by weight, of component (c).

2. A composition as claimed in claim 1 in which the polyurethane has a molecular weight of from 40,000 to 60,000.

3. A composition as claimed in claim 1 in which component (a) comprises a N-methyl polyurethane corresponding to the following formula:

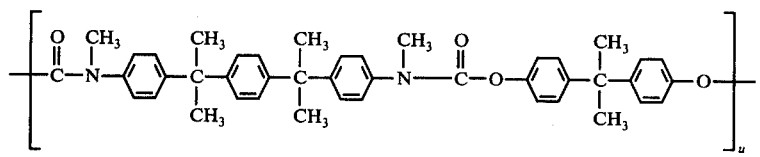

wherein
$u$ = about 75.

4. A composition as claimed in claim 1 in which component (b) is a graft polymer of 35%, by weight, styrene and 15%, by weight, acrylonitrile on 50%, by weight, of a polybutadiene having an average particle size of from 0.3 to 0.4 μ.

5. A composition as claimed in claim 1 in which component (b) is a graft copolymer of 47%, by weight, styrene and 23%, by weight, acrylonitrile on 30%, by weight, of a copolymer of 96%, by weight, butyl acrylate and 4%, by weight, methacrylamide N-methylol ether.

* * * * *